United States Patent [19]

Finlay-Maxwell

[11] 4,233,120
[45] Nov. 11, 1980

[54] DISTILLATION METHOD FOR SOLVENT RECOVERY

[75] Inventor: David Finlay-Maxwell, Huddersfield, England

[73] Assignee: John Gladstone & Company (Engineering) Limited, Galashiels, Scotland

[21] Appl. No.: 896,412

[22] Filed: Apr. 14, 1978

[51] Int. Cl.³ .................... B01D 3/42; B01D 3/36
[52] U.S. Cl. ............................. 203/2; 203/22; 203/23; 203/25; 203/85; 203/96; 203/87; 202/173; 202/177; 202/180; 202/186
[58] Field of Search .................... 203/22, 23, 25, 96, 203/95, 2, 3, 71, 73, 87, 39, 79, 85; 202/174, 170, 168, 169, 160, 180, 177, 186; 134/10–12

[56] References Cited

U.S. PATENT DOCUMENTS

| | | | |
|---|---|---|---|
| 2,310,569 | 2/1943 | Booth | 134/12 |
| 3,050,450 | 8/1962 | Huckins et al. | 203/2 |
| 3,254,024 | 5/1966 | Kleiss et al. | 203/25 |
| 3,324,010 | 6/1967 | Bauer et al. | 203/25 |
| 3,378,465 | 4/1968 | Brandt et al. | 203/25 |
| 3,875,017 | 4/1975 | Saari et al. | 202/174 |
| 3,894,915 | 7/1975 | Hoppe et al. | 202/180 |
| 3,957,531 | 5/1976 | Tipping et al. | 134/12 |
| 3,968,002 | 7/1976 | Standiford | 202/174 |

Primary Examiner—Wilbur L. Bascomb, Jr.
Attorney, Agent, or Firm—Pollock, Vande Sande & Priddy

[57] ABSTRACT

An improved solvent recovery process comprising distilling soiled solvent in a main still and conducting hot solvent vapor through a heat exchanger associated with a tank in which an azeotropic mixture of water and soiled solvent is maintained, which mixture boils at a temperature lower than the boiling point of the solvent alone. A series of tanks feed soiled solvent to the azeotropic mixture tank and then to the main still, and heat exchangers fed by the vapor from the main still and the vapor from the azeotropic mixture tank pre-heat the soiled solvent. Automatic control of water injection into the azeotropic mixture tank in dependence upon the temperature of conductivity of the tank contents maintains the composition of the azeotropic mixture, the injected water being taken from separators which separate water from condensate of the main still and azeotropic mixture tank vapors.

9 Claims, 1 Drawing Figure

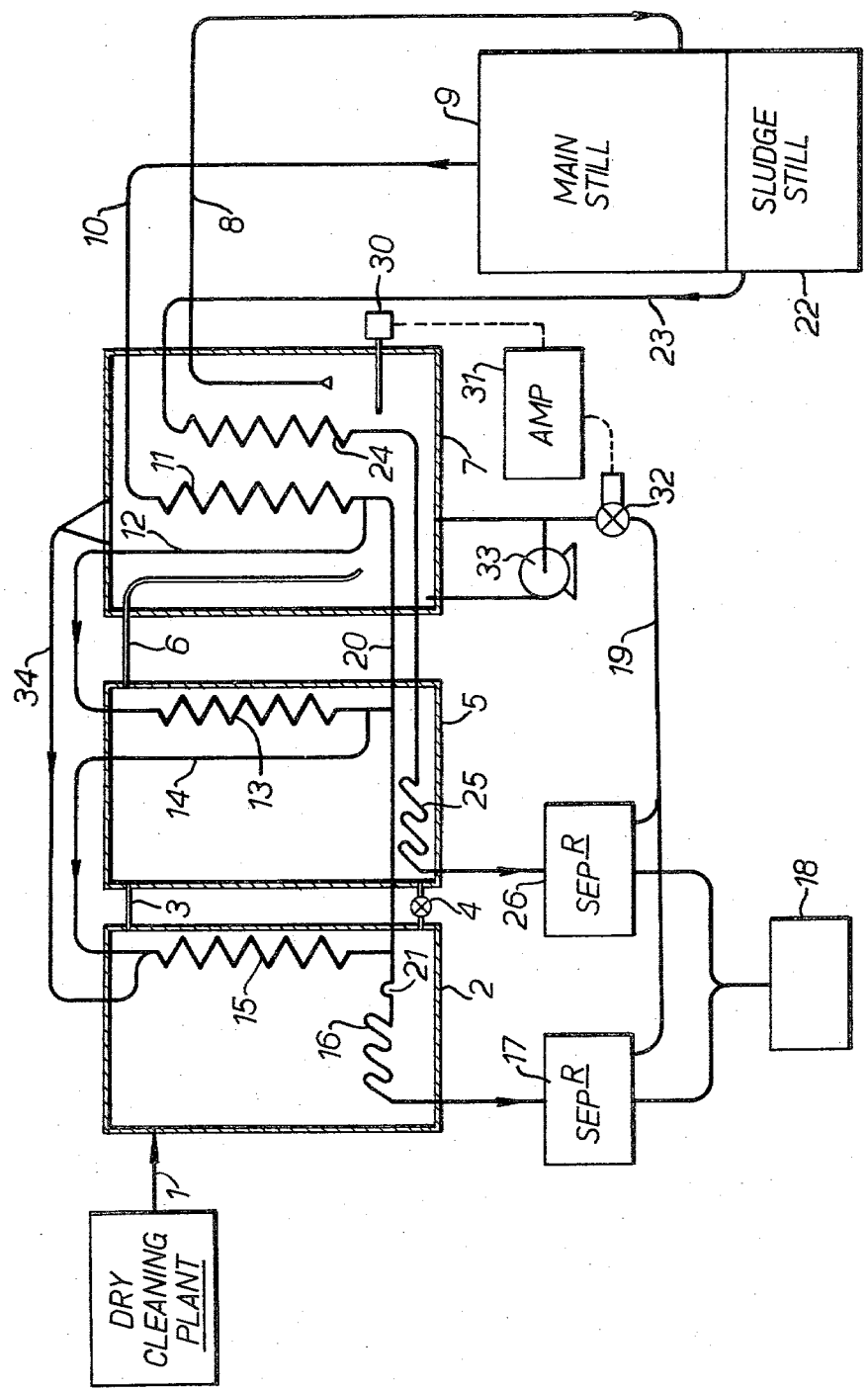

DISTILLATION METHOD FOR SOLVENT RECOVERY

FIELD OF THE INVENTION

This invention relates to solvent-recovery processes and provides a method and apparatus whereby substantial heat economy may be achieved in the recovery of a solvent which is soiled by its use in, for example, a dry-cleaning operation, or which in use has become mixed with another solvent.

BACKGROUND OF THE INVENTION

Solvent recovery processes which operate on the basis of distillation of the soiled solvent and condensation of the distilled vapor are well known. For separating mixtures of solvents from one another, fractional distillation is commonly effected in a single stage or a multi-stage process, depending upon the degree of purity required of the recovered solvents. In dry cleaning apparatus, it is known to pass the soiled solvent through a filter and into a still and to condense the boiled off solvent vapor, the condensate being fed back into the dry cleaning treatment chamber. In industrial dry cleaing apparatus, a greater or lesser degree of control of processing temperatures is effected, dependent upon the nature of the solvent or solvents being processed and the scale of the plant.

Although the prior art solvent recovery techniques have been efficient in their recovery of solvents, they have been wasteful in their utilization of energy. At best, only the simplest of heat exchange arrangements for pre-heating liquid inputs to the prior art stills has been known. With the recently awakening consciousness of energy conservation needs, coupled with increasing energy consumption costs, the need has arisen to operate in the field of solvent recovery with increased efficiency in energy utilization.

OBJECTS AND BRIEF SUMMARY OF THE INVENTION

Having regard to the foregoing, it is a principal object of the present invention to provide an improved solvent recovery process enabling more efficient utilization of energy in the operation of the process.

Another object of the invention is to provide an improved solvent recovery apparatus designed for implementing the process according to the invention.

Another object of the invention is to provide an improved dry cleaning plant.

These and other objects of the invention are achieved by a solvent recovery process which utilizes azeotropic mixture techniques to increase the amount of solvent recoverable upon the expenditure of a given amount of energy. Briefly stated, in accordance with the solvent recovery process according to this invention, soiled solvent is distilled and vapor from such distillation is utilized to heat to boiling an azeotropic mixture of solvent and water having a boiling temperature lower than that of the solvent alone. The vapor from the still and from the azeotropic mixture is condensed, and the condensate may, if desired, be further processed for removal of the small amount of water which was introduced for establishing the azeotropic mixture.

As will be appreciated by those skilled in the relevant arts, not all solvents are capable of forming an azeotropic mixture with water. The present invention thus is intended to be restricted to recovery of such organic solvents (hereinafter referred to as being of the type herein described) as are capable of forming an azeotropic mixture with water over a limited range of compositions, which mixture boils at a lower temperature than does the solvent alone.

Stated more explicitly, according to one of its aspects the present invention provides a solvent recovery process comprising the steps of (a) distilling a first volume of a soiled solvent of a type herein described in order to separate solvent vapor from the soiling contaminants; (b) passing the solvent vapor in indirect heat transfer relationship with a second volume of soiled solvent so as to effect heating of said second volume; (c) introducing controlled amounts of water into said second volume, such that said second volume comprises an azeotropic mixture of water and solvent having a boiling point lower than that of the solvent, whereby said azeotropic mixture can be heated to boiling by heat transfer from said solvent vapor; (d) condensing the solvent vapor and the vapor arising from boiling of the said azeotropic mixture of water and solvent; and (e) separating water from such condensate as is thereby obtained so as to recover the solvent therefrom.

According to another of its aspects, the present invention provides apparatus for use in carrying out the process just described, said apparatus comprising (a) a still for distilling said first volume of soiled solvent; (b) a tank for said second volume of soiled solvent; (c) an indirect heat exchanger associated with said tank and coupled with said still to be supplied with vapor therefrom, whereby to transfer heat from said vapor to the contents of said tank; (d) condenser means associated with said tank for receiving and condensing vapor formed therein; and (e) means for introducing into said tank controlled amounts of water such as to provide an azeotropic mixture of water and solvent therein.

The invention extends also to a dry cleaning plant incorporating a solvent recovery apparatus as just described.

The invention, together with objects and advantages thereof, will best be understood from consideration of the following detailed description of an exemplary embodiment thereof, which is illustrated in the accompanying drawing.

BRIEF DESCRIPTION OF THE DRAWING

The accompanying drawing is a schematic representation showing details of the solvent-recovery portion of a dry cleaning plant. The actual cleaning portion of the plant is not shown in detail and may take any operable form, and the present invention is not concerned with details of the cleaning process proper.

DETAILED DESCRIPTION OF THE EMBODIMENT

In the arrangement shown in the drawing, soiled solvent is delivered from the cleaning chamber of the dry cleaning plant by way of a conduit 1 into a first closed tank 2. An overflow conduit 3 and a bottom connection 4, which may as shown include a restrictor valve, couple tank 2 with a second closed tank 5. It will be understood that tanks 2 and 5 could be constituted by portions of a single closed tank separated from one another by a partition. From the upper part of tank 5, liquid may flow by way of a conduit 6 into the lower part of a third closed tank 7, from which in turn the liquid may pass through a conduit 8 to a main still 9.

Vapor from the main still 9 can pass through a conduit 10 and into an indirect heat exchanger 11 associated with the third tank 7. For increased efficiency, the heat exchanger 11 may comprise a plurality of parallel connected heat exchanger units. The bottom of heat exchanger 11 is connected by a conduit 12 to a further indirect heat exchanger 13 associated with the second tank 5, and heat exchanger 13 is connected by way of a further conduit 14 to yet another indirect heat exchanger 15 associated with the first tank 2. A conduit 34 couples third tank 7 to the top of heat exchanger 15.

The bottom of heat exchanger 15 is connected through a sensible heat extractor 16 in tank 2 to a separator 17 the function of which will be described later. The separator 17 is connected to a storage tank 18 and to a conduit 19 for a purpose which also is later described. The bottoms of heat exchangers 11 and 13 are connected to separator 17 by way of a conduit 20 which connects to the bottom of heat exchanger 15.

A liquid trap 21, which may be formed as part of heat extractor 16, is preferably provided to prevent vapor in heat exchangers 11 and 13 from passing directly to separator 17.

Contaminant residue from main still 9 is advantageously passed to a sludge still 22 which is connected by a conduit 23 to a further indirect heat exchanger 24 in third tank 7. The bottom of heat exchanger 24 is connected to a sensible heat extractor 25 in second tank 5 and thence to a further separator 26 which has outlets to storage tank 18 and to conduit 19.

In accordance with the invention, and as will be explained hereinafter, the contents of the third tank 7 are maintained in an azeotropic condition by the addition of controlled amounts of water, thereby lowering the boiling point of the water/solvent mixture in the tank. To this end a temperature sensor 30 responsive to the temperature of liquid in the third tank 7 is coupled by way of an amplifier 31 to control a valve 32 which, when opened, permits water returned from separators 17 and 26 to be injected into the third tank 7. In the illustrated embodiment, this is effected by means of a pump 33 having an inlet and an outlet connected to different points of the tank 7 so as to form a liquid circulatory path which is arranged to circulate the liquid in tank 7. In an alternative embodiment of the invention, a conductivity-sensing arrangement is employed to detect the changing composition of the mixture in third tank 7, and is arranged to control valve 32 to produce a substantially constant and azeotropic mixture in the tank.

In operation of the apparatus thus described, soiled solvent is first introduced into the tanks 2, 5 and 7 and into the main still 9. Replenishment of the main still 9 and of the tanks 2, 5 and 7 thereafter occurs automatically from the dry cleaning plant. Flow control devices may be provided to control replenishing flow of soiled solvent from one tank to the next and finally to the main still 9.

The main still 9 is then activated and heats the solvent therein to boiling. Hot solvent vapor from the main still 9 passes through heat exchanger 11 so as to heat solvent contained in tank 7. At a predetermined temperature, the temperature sensor 30 causes valve 32 to open, thereby to admit water from separators 17 and 26, which have been pre-primed with water, into tank 7. Water continues to be admitted until an azeotropic mixture of water and solvent is established in tank 7, and, such an azeotropic mixture boiling at a constant temperature below the boiling point of the solvent alone, the azeotropic mixture in tank 7 is boiled by heat transfer thereto by means of heat exchanger 11 supplied with hot vapor from main still 9.

Heat exchanger 11 acts as a first stage condenser for vapor from the main still. Second and third stage condensers are constituted by heat exchangers 13 and 15 which serve to pre-heat the contents of tanks 5 and 2 respectively. By the same token, heat exchanger 15 also operates as a condenser for the azeotropic mixture vapor from tank 7.

Condensate from the various heat exchangers is fed to water separators 17 and 26, most conveniently comprised by fractional distillators, and recovered solvent is supplied to storage tank 18.

Azeotropic mixture overflow from tank 7 into the main still 9 will flash into vapor at the elevated temperature of the main still, so that the composition of the liquid in the main still substantially constantly remains soiled solvent alone.

Specific operating conditions for a system in which the solvent to be recovered is perchlorethylene, having a boiling point of 121° C., will now briefly be discussed. Main still 9 yields perchlorethylene vapor at 121° C. to heat exchanger 11, where some condensation occurs. The azeotropic water/solvent mixture in third tank 7 is heated by heat exchanger 11 to boiling point at approximately 87° C. The control system comprising temperature sensor 30, amplifier 31 and valve 32 is arranged to open valve 32 when the temperature in the tank exceeds 89° C., so that, when the mixture in tank 7 changes towards a single liquid phase, it will rapidly be restored to a two-liquid (or multi-liquid phase).

Obviously the invention may be employed for the recovery of solvents other than perchloroethylene, and its use is not limited to the recovery of solvents in dry cleaning operations. Other variations and modifications of the apparatus described will occur to those skilled in the art. For example the solvent supply to the main still 9 might be independent of the tank 7, or the arrangement of the heat exchangers might be different.

What is claimed is:
1. A solvent recovery process comprising
 (a) distilling a first volume of a soiled solvent of a type herein described in order to separate solvent vapor from the soiling contaminants;
 (b) passing the solvent vapor in indirect heat transfer relationship with a second volume of soiled solvent so as to effect heating of said second volume;
 (c) introducing controlled amounts of water into said second volume such that said second volume comprises an azeotropic mixture of water and solvent having a boiling point lower than that of the solvent, whereby said azeotropic mixture can be heated to boiling by heat transfer from said solvent vapor;
 (d) condensing the solvent vapor and the vapor arising from boiling of the said azeotropic mixture of water and solvent;
 (e) separating water from such condensate as is thereby obtained so as to recover the solvent therefrom;
 (f) transferring and distilling contaminant sludge from the distillation of said first volume out of said first volume; and
 (g) passing solvent vapor arising from such distillation of said contaminant sludge in indirect heat exchange relationship with said second volume for heating the same.

2. A solvent recovery process according to claim 1 wherein as the said second volume is boiled off it is replenished by the addition of further soiled solvent and water, the temperature of said second volume being monitored and said water being introduced whenever the temperature of said second volume rises above a predetermined threshold level substantially corresponding to the boiling point of said azeotropic mixture, so as to maintain the azeotropic composition of said second volume.

3. A solvent recovery process according to claim 1 or 2, wherein said second volume is replenished from a third volume of soiled solvent, and vapor arising from boiling of said second volume is passed in indirect heat exchange relationship with said third volume.

4. A solvent recovery process according to claim 3 wherein vapor arising from distillation of said first volume is passed in indirect heat transfer relationship with said third volume of soiled solvent after passage thereof in indirect heat transfer relationship with said second volume.

5. A solvent recovery process which comprises
   (a) passing a soiled organic solvent of a type herein described through a plurality of tanks in series;
   (b) adding controlled amounts of water to the soiled solvent in the last of said tanks such that said tank contains an azeotropic mixture of water and solvent which boils at a lower temperature than does the solvent alone;
   (c) passing soiled solvent to a still in which it is distilled such that the solvent is evaporated to form a vapor at a temperature which is higher than the boiling point of said azeotropic mixture;
   (d) passing a countercurrent flow of said vapor through said tanks in series in indirect heat transfer relationship in each case with the contents of said tanks whereby said azeotropic mixture boils; and
   (e) condensing the vapor produced in said still and the vapor produced in said last tank; and
   (f) recovering condensate formed by such condensation.

6. A solvent recovery process according to claim 5, including the separation of water from the condensate formed by condensation of the vapor produced in said last tank.

7. A solvent recovery process according to claim 6, wherein said separated water is fed back into said last tank so as to maintain the azeotropic composition of the contents thereof during vaporization thereof and replenishment from the preceding tank in the series.

8. A solvent recovery process according to claim 7, including monitoring the temperature of the contents of said last tank, and introducing said water when the temperature rises above a predetermined threshold level substantially corresponding to the boiling point of said azeotropic mixture.

9. A solvent recovery process according to claim 5, wherein said soiled solvent is passed to said still from the last of said tanks.

* * * * *